United States Patent [19]
Puckett et al.

[11] Patent Number: 5,720,788
[45] Date of Patent: Feb. 24, 1998

[54] AIR FILTER ELEMENT AND AIR FILTER ASSEMBLY EMPLOYING THE FILTER ELEMENT

[75] Inventors: Ronald R. Puckett; Demetrios A. Tsengouras, both of Gastonia, N.C.

[73] Assignee: Dana Corporation, Toledo, Ohio

[21] Appl. No.: 497,078

[22] Filed: Jun. 30, 1995

[51] Int. Cl.$^6$ .................................. B01D 27/00
[52] U.S. Cl. .................... 55/337; 55/385.3; 55/498; 55/502; 55/510; 123/198 E
[58] Field of Search .................... 55/320, 330, 337, 55/385.3, 498, 500, 502, 510, 522, DIG. 28; 123/198 E

[56] References Cited

U.S. PATENT DOCUMENTS

| | | | |
|---|---|---|---|
| 2,988,170 | 6/1961 | Pritchard | 55/502 |
| 3,006,437 | 10/1961 | Lowther | 183/36 |
| 3,038,211 | 6/1962 | Luedi | 55/510 |
| 3,048,959 | 8/1962 | Lowther | 55/320 |
| 3,095,290 | 6/1963 | Hockett | 55/510 |
| 3,431,335 | 3/1969 | Henning | 55/502 |
| 3,696,591 | 10/1972 | Bennett et al. | 55/337 |
| 4,261,710 | 4/1981 | Sullivan | 55/502 |
| 4,349,363 | 9/1982 | Patel et al. | 55/502 |
| 4,511,379 | 4/1985 | Hauptmann | 55/238 |
| 4,606,743 | 8/1986 | Shuman | 55/323 |
| 4,720,292 | 1/1988 | Engel et al. | 55/337 |
| 4,758,256 | 7/1988 | Machado | 55/498 |
| 4,759,783 | 7/1988 | Machado | 55/498 |
| 5,106,397 | 4/1992 | Jaroszczyk et al. | 55/502 |
| B1 4,720,292 | 9/1991 | Engel et al. | 55/337 |

FOREIGN PATENT DOCUMENTS 53-68310  6/1978  Japan ..................... 55/510

Primary Examiner—C. Scott Bushey
Attorney, Agent, or Firm—Millen, White, Zelane, & Branigan, P.C.

[57] ABSTRACT

A replaceable filter element is installed in a filter assembly including a filter housing. There is a substantially annular space between the filter element and the housing and an air inlet for introducing inlet air tangentially with respect to the annular space. The filter element employed has a closed top and an open bottom communicating with a hollow core. An annular filter media is included in the filter element, the filter media having a top end and a bottom end with an outwardly projecting flange at the bottom end. The outwardly projecting flange has an annular rib thereon, spaced from the filter media, to define a trough between the annular rib and the filter media for retaining debris thereon. When the filter element is removed for replacement, debris accumulated on the flange is retained in the trough.

1 Claim, 4 Drawing Sheets

AIR FILTER ELEMENT AND AIR FILTER ASSEMBLY EMPLOYING THE FILTER ELEMENT

FIELD OF THE INVENTION

The present invention is directed to air filter elements for use with centrifugal filter assemblies. More particularly, the present invention relates to improvements in air filter elements and assemblies used with internal combustion engines.

BACKGROUND OF THE INVENTION

A current air filter arrangement for air filters used with internal combustion engines vertically disposes an air filter element within a conical housing. Both the air filter element and the housing have a conical configuration with air being introduced axially at one end of the air filter. The air flows over the outside surface of the air filter element and is pulled through the filter medium in a radial direction into the hollow core of the filter element by a vacuum created in the engine as the pistons of the engine reciprocate.

In order to mechanically remove dust particles and other debris from inlet air, the filter media of the air filter element necessarily decreases the flow of inlet air, increasing "restriction". The internal combustion engine which the air is being delivered must therefore devote a portion of its output power to drawing air through the filter media. To the extent that restriction can be decreased, the power output of the engine is increased and the efficiency of the engine improves. It is important to improve the efficiency of internal combustion engines because higher efficiency means lower fuel consumption, less pollution and longer engine life as well as enhanced drivability if the engine is used to power an automotive vehicle. While improvements in air filter efficiency may be incremental and hardly noticeable for an individual vehicle, when combined with other incremental efficiency enhancing improvements, a cumulative effect results which is not only apparent in individual vehicles, but has an enormous impact when an entire fleet of vehicles is considered. Moreover, the effect of an incremental advance by itself when considered over a substantial portion of the fleet can become very significant.

Normally, with automotive vehicles, air filter elements are periodically replaced because they become clogged with dust particles and debris. If air filter elements are not replaced, then restriction increases and engine efficiency drops, resulting in numerous undesirable effects. Air filter elements are not inexpensive and must be disposed of when removed, which results in an additional expense to everyone involved. In order to mitigate this expense just slightly, it is desirable to extend, if possible, the life of air filter elements so that the vehicle owners need not replace air filter elements as frequently and vehicle maintenance businesses need not collect and dispose of as many air filter elements.

The prior art includes air filter arrangements in which air is introduced tangentially into a vertically disposed air filter housing for passage through a vertically disposed filter element to remove dust and debris from an air stream before the air stream is introduced to an internal combustion engine. However, these arrangements have not taken advantage of phenomenon which results from a vertically oriented arrangement in such a way as to enhance the overall performance by not only increasing engine efficiency, but increasing the life of the filter elements, as well as having filter elements which are readily and safely replaceable.

SUMMARY OF THE INVENTION

The present invention is directed to a replaceable filter element for installation in a filter assembly including a filter housing wherein there is a substantially annular space between the filter element and the housing. In the invention an air inlet is provided in the housing for introducing inlet air tangentially with respect to the annular space. The filter element employed has a closed top and an open bottom communicating with a hollow core. The improvement provided by the present invention comprises an annular filter media having a top and a bottom end and an outwardly projecting flange at the bottom of the filter element. The outwardly projecting flange has an annular rib thereon spaced from the filter media to define a trough between the annular rib and the filter media for retaining debris thereon. When the filter element is removed for replacement, debris accumulated on the flange is retained in the trough.

In another aspect, the present invention is directed to an air filter assembly including the aforedescribed air filter element and its associated cylindrical housing wherein the housing is disposed vertically to cause particles removed from the air stream by centrifugal force to deposit by gravity on the flange.

DETAILED DESCRIPTION

Figure 1:
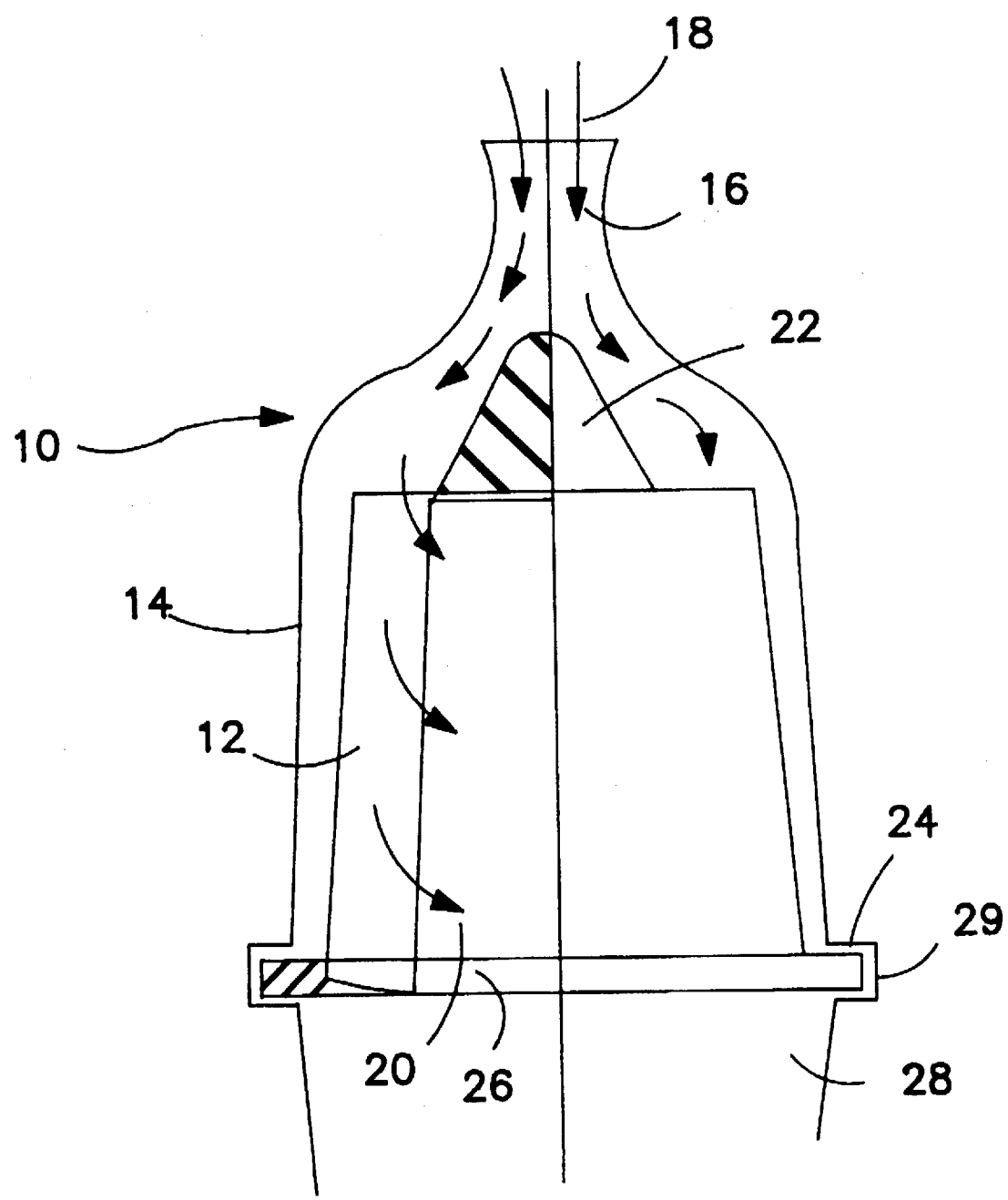
FIG. 1 is a side elevational view showing a prior art air filter arrangement.

Referring now to FIG. 1, there is shown a prior art air filter assembly 10 which is to be replaced by a filter assembly configured in accordance with the principles of the present invention. In the prior art filter assembly 10, a frustal conical filter element 12 is positioned within a frustal conical housing 14. The frustal conical housing 14 has an inlet 16 through which inlet air 18 flows for filtering by the filter media of filter element 12. The filter element 12 has a hollow core 20 and a conical end cap 22. The conical end cap 22 prevents the air 18 from flowing in to the hollow core 20 of the filter element 12 without first passing through the filter media of the filter element 12.

The filter element 12 has an annular retaining flange 24 having an opening 26 therethrough, through which air passes to an annular air inlet 28 for passage to an internal combustion engine (not shown) of an automotive vehicle (not shown). The annular retaining flange is clamped by a C-section clamp 29 to the annular air inlet 28.

Referring now to FIGS. 2–7, an air filter assembly 30 configured in accordance with the principles of the present invention includes a filter element 32, configured in accordance with the principles of the present invention. The air filter assembly 30 includes a substantially cylindrical housing 33 which has a cylindrical side wall 34, a circular top wall 36, and an open bottom 38. Positioned in the cylindrical side wall 34 is an air inlet 40 which directs a stream of inlet air in the direction of arrows 42. There is an annular space 44 between an inner wall surface 46 of the housing 33 and the exterior 47 of the filter element 32. Some of the inlet air exemplified by arrow 48 impinges obliquely on the filter element 32 while the remainder of the inlet air follows the arrows 42 in a tangential path restrained by the geometry of annular space 44.

Figure 2:
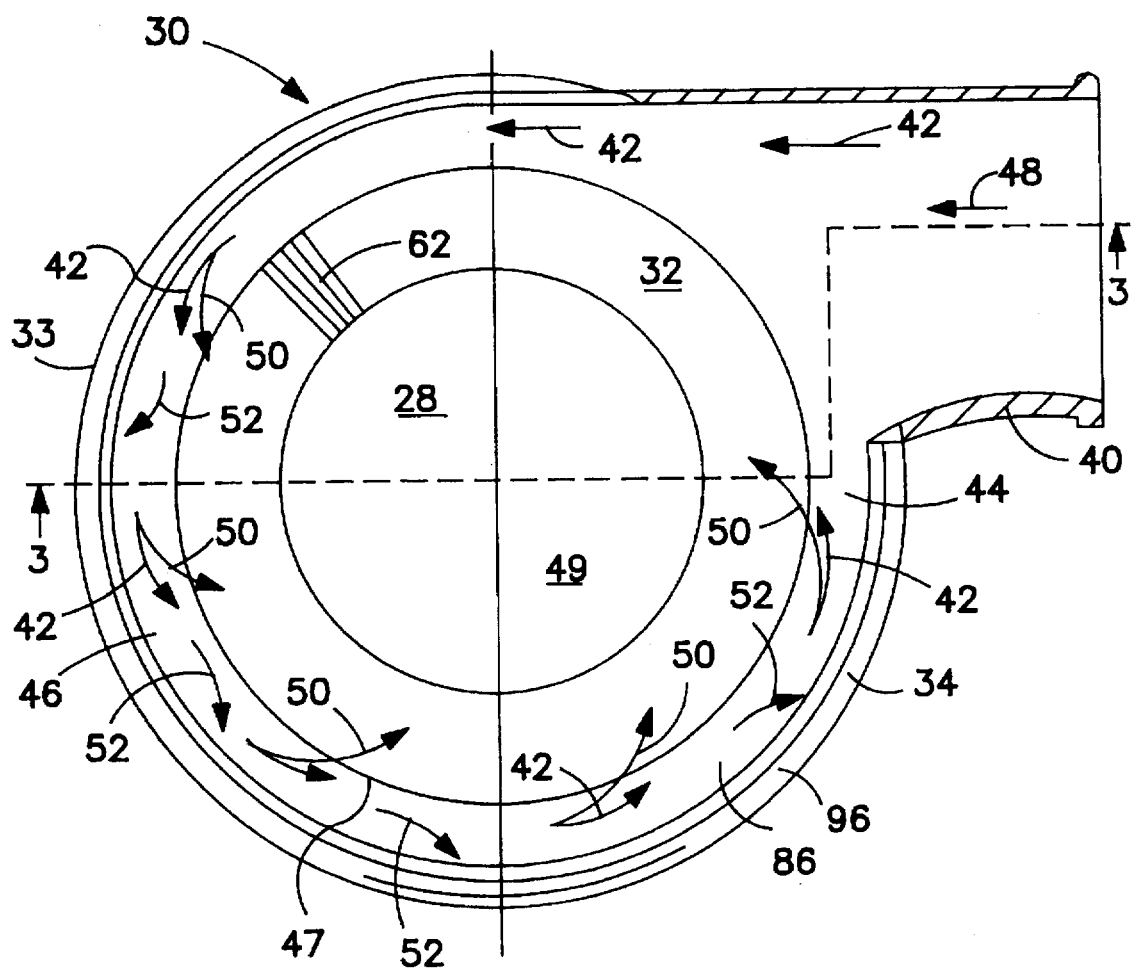
FIG. 2 is a top elevational view of an air filter assembly configured in accordance with the principles of the present invention.
Figure 3:
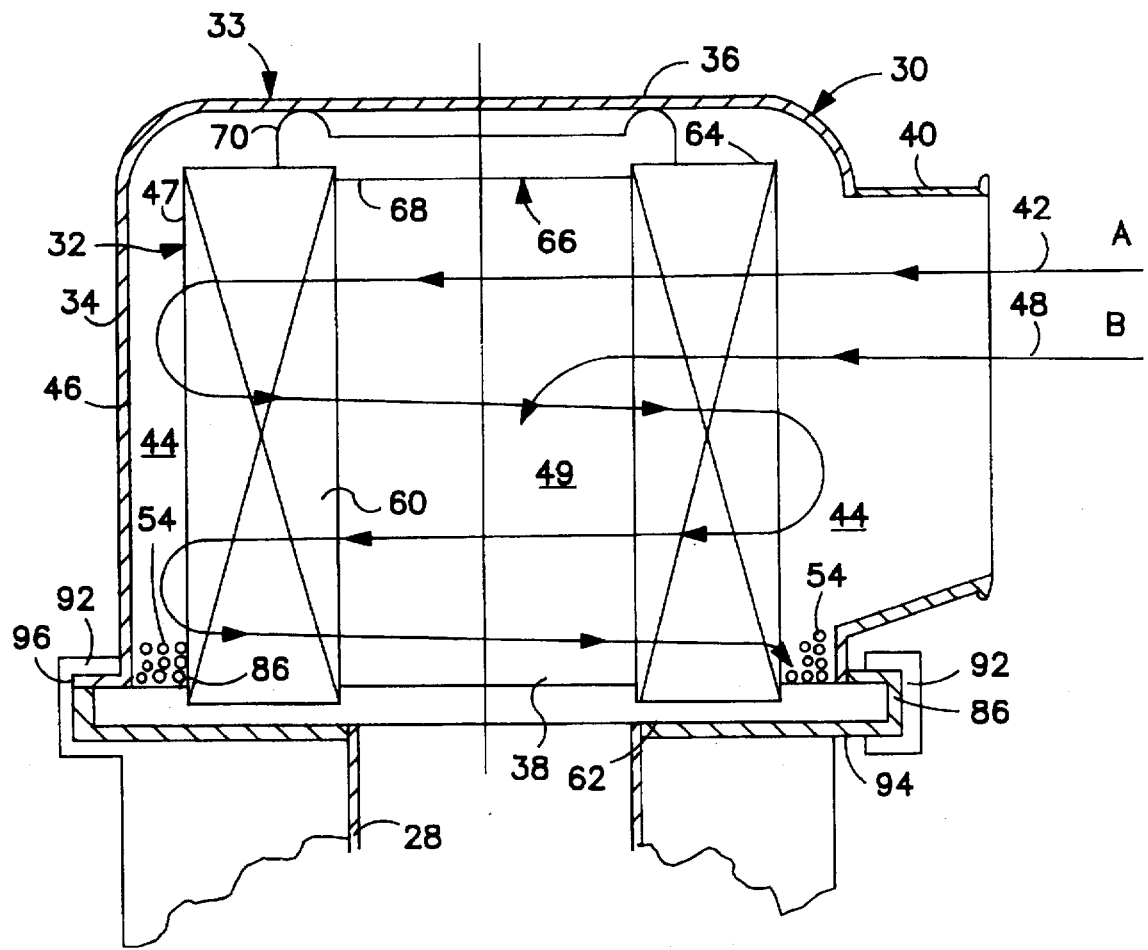
FIG. 3 is a side elevation taken along lines 3—3 of FIG. 2.
Figure 4:
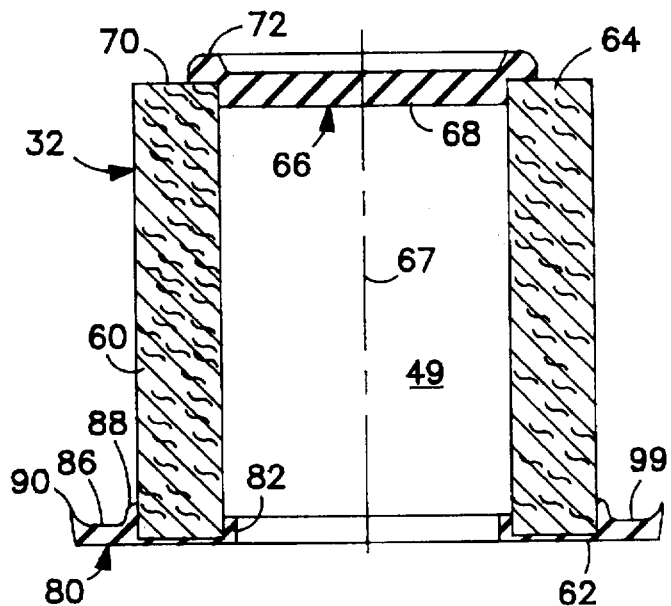
FIG. 4 is a side elevation of a filter element used in the assembly of FIGS. 2 and 3.

As is seen in FIG. 2, a vacuum within a hollow core 49 of the filter element 32 pulls air through the filter element as is illustrated by arrows 50. Since the air flow in annular space 44 is circular, relatively heavy particles entrained by the air flow tend to migrate toward the wall 46 in the direction of arrows 52. Upon impinging upon the wall 46, these particles fall by gravity along the wall and accumulate at the bottom of the annular space 44. As is illustrated by the pile of particles 54 in FIG. 3, the particles remain outside of the filter element 32.

Since the particles 54 accumulate outside of the filter element 32, the particles 54 do not clog the filter element 32 and the life of the filter element 32 is necessarily extended. This results in a filter assembly with an increased "capacity". The filter element 32 tends to trap mostly light particles since the heavy particles are deposited in the pile 54.

In that the filter assembly 30 is used on automotive vehicles, the filter element 32 is periodically changed. Even though the life of the element 32 is extended because the particles 54 removed by centrifugal force and gravity do not clog the filter element, eventually lighter particles, trapped in the filter element 32, will begin to increase the restriction of inlet air. The filter element 32, illustrated in FIGS. 2–7, has a configuration which is not only suitable for a filter assembly 30 which utilizes centrifugal force as well as tangential flow, but is also readily replaceable.

Referring now more specifically to FIGS. 4–7, it is seen that the filter element 32 is comprised of a pleated filter media 60 of phenolic paper (T-33) which is the same media utilized for filter elements such as the filter element 12 of the prior art arrangement 10, shown in FIG. 1. The pleated filter media 60 is annular so as to define the hollow central core 49 and is open at lower end 62. At its upper end 64, the filter media 60 is sealed with a plug 66. The filter media 60 and filter element 32 are oriented about a vertical axis 67.

The plug 66 has an inserted portion 68 which projects slightly into the hollow core 49 and a flange portion 70 which extends slightly over the upper end 64 of the pleated media 60. The flange portion 70 is slightly raised to form an annular ring 72 which surrounds a round indentation 74. The plug 66 prevents inlet air from entering the hollow core 49 in the axial direction. The plug 66 is made of polyurethane foam and is adhered in a conventional way to the upper end 64 of the filter media 60.

Figure 5:
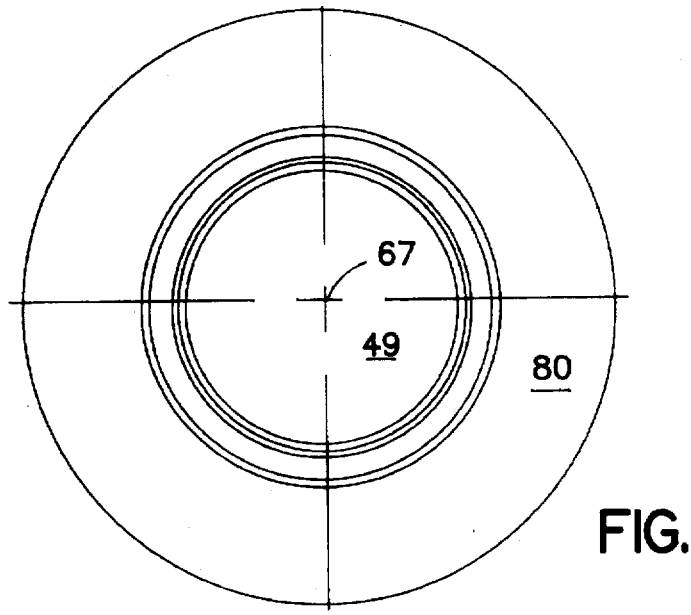
FIG. 5 is a bottom view of the air filter element of FIG. 4.
Figure 6:
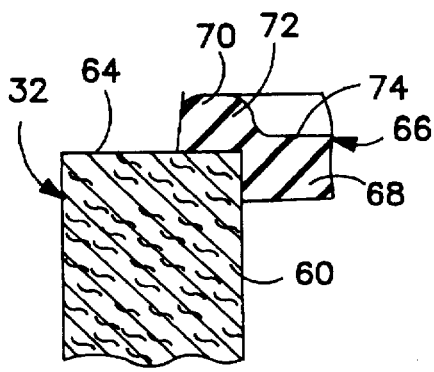
FIG. 6 is an enlarged side elevation of a portion of the top of the air filter element of FIG. 4.
Figure 7:
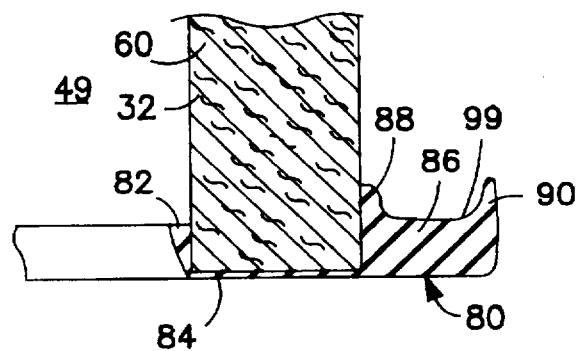
FIG. 7 is an enlarged side elevation of a portion of the bottom of the filter element of FIG. 4.

Referring more specifically to FIGS. 5 and 7, the filter media 60 has adhered thereto an annular gasket 80. The annular gasket 80 has a inner bead 82 which is adhered to the filter media 60 and extends into the hollow core 49. Extending radially from the annular bead 82 is a thin pad portion 84 which extends over the bottom end 62 of the filter media 60. Extending radially from the filter media 60 is an annular flange 86. The annular flange 86 has an axially extending bead 88 which extends upwardly therefrom on the outside surface of the pleated filter media 60. The flange 86 also has a projecting annular rib 90 extending upwardly in an axial direction. The annular rib 90 is radially spaced from the bead 88. The gasket 80 is preferably made from polyurethane foam having a high density with fine cells. Such a material is available from Motor craft and, is identified as "red BDAXXA (30250)."

Referring again to FIG. 3, it is seen that the flange portion 86 of the gasket 80 is clamped by a tensioned annular clamp 92 to the filtered air inlet 28, which clamp 92 fits over a first flange 94 on the inlet 28 and a second flange 96 at the bottom end of the housing 33. The top wall 36 of the housing 33 bears against the annular rib 70 on the plug 66 to press the annular flange 86 against the radially extending flange 94 of the filtered air inlet 28 for the engine.

When it is necessary to change the filter element 32, the clamp 92 is removed and the housing 33 lifted from the engine inlet 28. The circular rib 90 then projects upward to form an annular trough 99 which helps retain the debris 54 on the filter element 32 so that the debris does not fall into the engine inlet 28, but is rather retained on the disposable filter element 32. Accordingly, when a used filter element 32 is replaced, it is lifted from the air inlet 28 with a minimal chance that the particle debris 54 will be dislodged which might negate much of the work done by the filter media 60 since installation of the filter element.

It has been found that using the air filter assembly 30 of the present invention, shown in FIGS. 2–7, results in about a 3 percent increase output horsepower in a standard automobile engine over using the air filter assembly 10 of the prior art, shown in FIG. 1. In addition, there is substantial noise reduction due to decreased restriction. These advantages are combined with what amounts to an increase in filter capacity due to centrifugal precipitation of large particles.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A replaceable filter element for installation in a filter assembly used for removing particles from air for internal combustion engines, the filter assembly including a filter housing having a closed top and an open bottom, wherein there is annular space between the filter element and the housing and an air inlet for introducing inlet air tangentially with respect to the annular space and wherein the filter element has a closed top and an open bottom communicating with a hollow core, the improvement comprising:

an annular paper filter media oriented about a vertical axis and having a hollow core and an outside surface, a top end and a bottom end;

an outwardly projecting annular flange extending completely over the bottom end of the filter to form a gasket which seals with the housing, the outwardly projecting annular flange having an annular rib thereon and unitary therewith which is spaced from the filter media to define a trough between the annular rib and the filter media for retaining debris thereon, whereby when the filter element is removed for replacement, debris accumulated on the flange is retained in the trough;

the flange including a first bead which extends into the hollow core of the filter media and a second bead which extends axially from the flange over the outside surface of the filter media; and a plug fixed to the top end of the filter media to close the top end of the filter media, the plug having an annular rim adapted to abut the closed end of the filter housing when the filter element is mounted in the housing.

* * * * *